United States Patent
Xiong et al.

(10) Patent No.: US 12,308,898 B2
(45) Date of Patent: May 20, 2025

(54) SYSTEM AND METHOD FOR DISTINGUISHING BETWEEN ACTIVE AND PASSIVE NFC DEVICES

(71) Applicant: STMICROELECTRONICS (CHINA) INVESTMENT CO., LTD, Shanghai (CN)

(72) Inventors: Tianhao Xiong, Shanghai (CN); Gang Wu, Shanghai (CN)

(73) Assignee: STMICROELECTRONICS (CHINA) INVESTMENT CO., LTD, Shanghai (CN)

( * ) Notice: Subject to any disclaimer, the term of this patent is extended or adjusted under 35 U.S.C. 154(b) by 336 days.

(21) Appl. No.: 17/779,517

(22) PCT Filed: Nov. 27, 2019

(86) PCT No.: PCT/CN2019/121170
§ 371 (c)(1),
(2) Date: May 24, 2022

(87) PCT Pub. No.: WO2021/102725
PCT Pub. Date: Jun. 3, 2021

(65) Prior Publication Data
US 2023/0021561 A1     Jan. 26, 2023

(51) Int. Cl.
    *H04B 5/77*     (2024.01)
    *H04B 5/79*     (2024.01)
(52) U.S. Cl.
    CPC ................ *H04B 5/77* (2024.01); *H04B 5/79* (2024.01)

(58) Field of Classification Search
CPC ............... H04B 5/72; H04B 5/77; H04B 5/79
See application file for complete search history.

(56) References Cited

U.S. PATENT DOCUMENTS

| 9,870,660 B1 | 1/2018 | Patterson |
| 10,192,373 B1 | 1/2019 | Patterson |

(Continued)

FOREIGN PATENT DOCUMENTS

| CN | 101517594 A | 8/2009 |
| CN | 104242377 A | 12/2014 |

(Continued)

OTHER PUBLICATIONS

Chen Zhen, "The Design of NFC Tag's Channel Code and Decode Unit and Information Safety Unit," China Master's Theses Full-text Database, May 1, 2014 (56 pgs.); plus annexed Written Opinion dated Aug. 26, 2020, for counterpart Intl. Appl. No. PCT/CN2019/121170 provided for relevance (4 pgs.).

*Primary Examiner* — Timothy X Pham
(74) *Attorney, Agent, or Firm* — Seed IP Law Group LLP

(57) ABSTRACT

A near field communication (NFC) reader detects whether NFC devices are passive NFC devices or active NFC devices. The NFC reader outputs an interrogation signal and a carrier signal. When the NFC reader receives a response signal from an NFC device responsive to the interrogation signal, the NFC reader interrupts the carrier signal before the end of the response signal. The NFC reader determines whether the NFC device is a passive NFC device or an active NFC device depending on whether the response signal continues during the interruption of the interrogation signal.

20 Claims, 9 Drawing Sheets

(56) References Cited

U.S. PATENT DOCUMENTS

| | | | |
|---|---|---|---|
| 2010/0164690 A1* | 7/2010 | Raphaeli | H04W 74/00 340/10.2 |
| 2011/0165862 A1 | 7/2011 | Yu et al. | |
| 2012/0280650 A1 | 11/2012 | Kim et al. | |
| 2013/0062959 A1 | 3/2013 | Lee et al. | |
| 2014/0353390 A1 | 12/2014 | Narendra et al. | |
| 2015/0177330 A1 | 6/2015 | Morris | |
| 2017/0098149 A1 | 4/2017 | Kesler et al. | |
| 2017/0289742 A1 | 10/2017 | Asakura | |
| 2017/0331317 A1 | 11/2017 | Wheeland et al. | |
| 2019/0036568 A1 | 1/2019 | Kovacic et al. | |
| 2020/0151403 A1 | 5/2020 | Forster | |
| 2021/0044978 A1* | 2/2021 | Michaelis | H04W 12/63 |
| 2021/0374365 A1 | 12/2021 | Patricio et al. | |
| 2024/0048183 A1 | 2/2024 | Xiong et al. | |

FOREIGN PATENT DOCUMENTS

| | | |
|---|---|---|
| CN | 106059629 A | 10/2016 |
| CN | 107210786 A | 9/2017 |
| CN | 108695998 A | 10/2018 |
| EP | 2701314 A1 | 2/2014 |
| EP | 3376679 A1 | 9/2018 |
| WO | WO 2018005135 A1 | 1/2018 |
| WO | WO 2020217909 A1 | 10/2020 |
| WO | WO 2022133717 A1 | 6/2022 |

\* cited by examiner

SYSTEM AND METHOD FOR DISTINGUISHING BETWEEN ACTIVE AND PASSIVE NFC DEVICES

BACKGROUND

Technical Field

The present disclosure relates to the field of near field communication (NFC). The present disclosure relates more particularly to identification of NFC devices by an NFC reader.

Description of the Related Art

NFC technology utilizes radiofrequency signals to enable devices to communicate with each other in close proximity. Many applications of NFC technology utilize an NFC reader to interrogate and receive data from an NFC device. The NFC reader typically outputs an interrogation signal. If an NFC device is within range of the interrogation signal, then the NFC device responds by providing an identification signal identifying the NFC device. After the NFC device has identified itself, the NFC reader and the NFC device can further exchange information.

BRIEF SUMMARY

One embodiment is a method including transmitting an interrogation signal from an NFC reader, transmitting a carrier signal from the NFC reader, and receiving a portion of an identification signal from an NFC device responsive to the interrogation signal. The method includes reducing an amplitude of the carrier signal for a selected duration after receiving the portion of the identification signal and prior to receiving an entirety of the identification signal. The method includes detecting whether the NFC device continues to transmit the identification signal during the selected duration. The method includes determining whether the NFC device is an active NFC device or a passive NFC device based on whether the identification signal continues while the amplitude of the carrier signal is reduced.

One embodiment is an NFC reader including a radiofrequency transceiver configured to transmit and receive NFC signals. The NFC reader includes a control system coupled to the radiofrequency transceiver. The control system is configured to cause the radiofrequency transceiver to output an interrogation signal, to output a carrier signal and to interrupt the carrier signal upon receiving an initial portion of an identification signal from an NFC device. The control system is configured to determine whether the NFC device is an active NFC device or a passive NFC device based whether the identification signal continues during interruption of the carrier signal.

One embodiment is a method including establishing NFC between an NFC reader and an NFC device. The method includes, after establishing NFC between the NFC reader and the NFC device, outputting an interrogation signal from the NFC reader. The method includes outputting a carrier field from the NFC reader and receiving, with the NFC reader, a response signal from the NFC device responsive to the interrogation signal. The method includes interrupting output of the carrier field while receiving the response signal and determining whether the NFC device is a passive NFC device or an active NFC device based on whether the response signal continues during interruption of the carrier signal.

DETAILED DESCRIPTION

Figure 1:
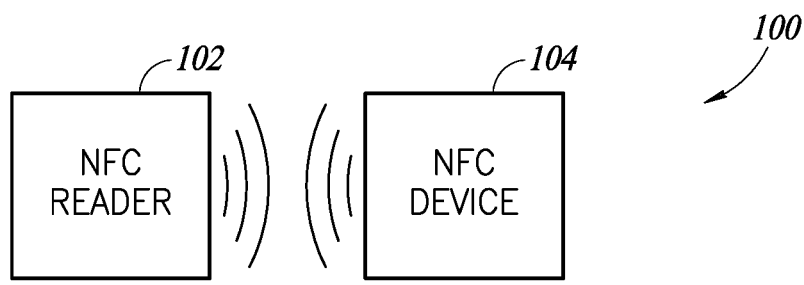
FIG. 1 is a block diagram of an NFC system, according to one embodiment.

FIG. 1 is a block diagram of a near field communication (NFC) system 100, according to one embodiment. The NFC system 100 includes an NFC reader 102 and an NFC device 104. The NFC reader 102 and the NFC device 104 communicate with each other utilizing NFC technology.

The NFC reader 102 periodically outputs an interrogation signal. The interrogation signal is configured to induce a response from NFC devices that are in communication range with the NFC reader 102. If the NFC device 104 is within range of the NFC reader 102, then the NFC device 104 can respond to the interrogation signal.

In one embodiment, the NFC reader 102 outputs an interrogation signal in accordance with one or more NFC protocols. The NFC protocols define the structure of an interrogation signal. The protocols can define the frequency of the interrogation signal, the type of data included in the interrogation signal, the amount of data included in the interrogation signal, and the duration of the interrogation signal. If the NFC device 104 operates with the same protocol as the interrogation signal, then the NFC device 104 will respond to the interrogation signal. The protocols also define the structure of the initial response of the NFC device 104 to the interrogation signal from the NFC reader 102.

The NFC reader 102 also outputs a carrier signal. The carrier signal is a radiofrequency signal that enables certain types of near field communication devices to harvest energy from the carrier signal. The energy harvested from the carrier signal can be utilized to power a response to the interrogation signal. The carrier signal is described in more detail below.

In one embodiment, the NFC device 104 is a passive load modulation NFC device 104. Passive load modulation NFC devices do not have their own power sources. Instead, passive load modulation NFC devices are powered by the carrier signal output from the NFC reader 102. Accordingly, passive load modulation NFC devices include energy harvesting circuitry that harvests energy from the carrier signal output by the NFC reader 102. As used herein, the term "passive NFC device" may be used interchangeably with the term "passive load modulation NFC device".

Passive load modulation includes modifying the impedance of an antenna coil of the passive NFC device at the rate of a data carrying load modulation signal. This impedance modulation is echoed by inductive coupling in the impedance of an antenna coil of the NFC reader 102. The NFC reader 102 can extract from its antenna signal the load modulation signal used by the passive NFC device. In this way, the NFC reader 102 can extract an identification or other data from the passive NFC device. Passive load modulation NFC devices as described herein can operate in accordance with well understood passive load modulation techniques.

When a passive load modulation NFC device receives an interrogation signal from the NFC reader 102, the passive load modulation NFC device outputs an identification signal by modifying the impedance of its antenna coil. The passive load modulation NFC device modulates the impedance of the antenna coil with energy harvested from the carrier signal provided by the NFC reader 102. Accordingly, the passive load modulation device is powered by the carrier signal output by the NFC reader 102. As used herein, outputting an identification signal from a passive NFC device corresponds to the modulation of the impedance of the antenna coil of the passive NFC device in a way that can be detected by the NFC reader 102.

In one embodiment, the NFC device 104 is an active load modulation NFC device. Active load modulation NFC devices are powered by a power source separate from the NFC reader 102. Accordingly, when an active load modulation NFC device receives an interrogation signal, the active load modulation NFC device responds by outputting a radiofrequency signal and modulating the radiofrequency signal under the power of a power source separate from the NFC reader 102. Data is transmitted from the NFC device 104 by modulating the radiofrequency signal output by the NFC device 104. As used herein, the term "active NFC device" may be used interchangeably with the term "active load modulation NFC device". Active load modulation can be achieved in other ways without departing from the scope of the present disclosure.

Active and passive load modulation NFC devices typically operate in accordance with particular protocols. In particular, passive load modulation NFC devices typically operate in accordance with a different subset of NFC protocols than do active load modulation NFC devices. In most cases, the NFC reader 102 can accurately determine whether the NFC device 104 is an active NFC device or a passive NFC device based on the protocols with which the NFC device 104 responds to the NFC reader 102.

However, there are cases in which the NFC device 104 may operate in accordance with a protocol that does not correspond to its true nature. In some cases, the NFC device 104 may be a passive NFC device that operates in accordance with a protocol typically reserved for active NFC devices. In other cases, the NFC device 104 may be an active NFC device that operates in accordance with a protocol typically reserved for passive NFC devices. If an NFC reader does not correctly identify the type of an NFC device, it is possible that the NFC device can be damaged.

In one embodiment, the NFC reader 102, or an electronic device that incorporates the NFC reader 102, includes wireless charging circuitry that is separate from the NFC communication circuitry. The wireless charging circuitry has the ability to charge the battery of the NFC device 104 if the NFC device 104 is an active NFC device. In particular, the wireless charging circuitry is able to output a charging field. The active NFC device can harvest energy from the charging field. In this manner, the wireless charging circuitry can charge a battery of an active NFC device.

When describing embodiments in which separate wireless charging circuitry is used to charge a battery of an active NFC device, the NFC reader 102 may be described as including the wireless charging circuitry. The wireless charging circuitry includes an antenna coil that is separate from an NFC communication antenna of the NFC reader 102 and does not operate in accordance with NFC communication frequencies and protocols. Thus, the NFC reader 102 may be a device that includes both NFC communication circuitry and separate wireless charging circuitry.

In one embodiment, the wireless charging circuitry operates in accordance with a Qi wireless charging standard. The Qi wireless charging circuitry outputs a charging field in a range between 87 kHz and 205 kHz. NFC signals typically Accordingly, the charging field is not transmitted with the frequency of NFC communicate at a frequency of 13.56 MHz. Accordingly, the Qi charging field is outside a range of NFC communication signals.

Passive NFC devices can be damaged by the charging field output by the wireless charging circuitry. If an NFC reader misidentifies a passive NFC device as an active NFC device, then it is possible that the NFC reader could cause the wireless charging circuitry to output a charging field that could damage the passive NFC device.

The NFC reader 102 is able to reliably identify whether the NFC device 104 is an active NFC device or a passive NFC device. As set forth above, in some instances it is possible that a passive NFC device could utilize a protocol typically associated with active NFC devices, or vice versa. Accordingly, after the NFC reader 102 has initially established communication with the NFC device 104, the NFC reader 102 performs a further test to determine whether the NFC device 104 is an active NFC device or a passive NFC device. Thus, the NFC reader 102 does not determine whether the NFC device 104 is active or passive based solely on the NFC protocol with which the NFC device 104 operates.

When the NFC reader 102 outputs an interrogation signal, the NFC reader 102 also outputs a carrier signal. The NFC device 104 responds by providing an identification signal or another type of response signal. The identification signal is defined by a frame during which the NFC device 104 transmits a radiofrequency signal and modulates the radiofrequency signal. The modulation of the radiofrequency signal corresponds to the data provided by the NFC device 104. The beginning of the modulated radiofrequency signal from the NFC device 104 correspond to the start of the frame. The conclusion of the modulated frequency signal from the NFC device 104 correspond to the end of the frame. As set forth in more detail below, the NFC reader 102 utilizes the structure of the response to reliably determine if the NFC device 104 is a passive NFC device or an active NFC device.

In one embodiment, the NFC reader 102 transmits an interrogation signal. After transmitting the interrogation signal, the NFC reader 102 transmits the carrier signal. When the NFC reader 102 receives the start of frame of the response or identification signal from the NFC device 104, the NFC reader 102 interrupts the output of the carrier signal for a duration of time between the start of the frame at the end of the frame. In other words, the NFC reader 102 interrupts the carrier signal for a selected duration of time that begins after the start of the frame and ends before the end of the frame. This selected interruption of the carrier signal can be utilized to determine whether the NFC device 104 is an active NFC device or a passive NFC device.

The NFC reader 102 listens for the identification signal during the disruption of the carrier signal. If the NFC device 104 continues to transmit the identification signal during the interruption of the carrier signal, then the NFC device 104 is an active NFC device. This determination can be made because the active NFC device outputs the identification signal via a power source separate from the NFC reader 102. In other words, the active NFC device can transmit the identification signal or response signal whether or not the carrier signal is present. If the NFC device 104 ceases to transmit the identification signal during the interruption of the carrier signal, then the NFC device 104 is a passive NFC device. In this way, the NFC reader 102 is able to reliably determine whether the NFC device 104 is a passive NFC device or an active NFC device.

The NFC reader 102 is able to selectively cause the wireless charging circuitry to output the charging signal based on whether or not the NFC device 104 is an active NFC device or a passive NFC device. If the NFC reader 102 determines that the NFC device 104 is an active NFC device, then the NFC reader 102 may cause the wireless charging circuitry to output the charging field to charge the battery of the NFC device 104. If the NFC reader 102 determines that the NFC device 104 is a passive NFC device, then the NFC reader 102 does not cause the wireless charging circuitry to output the charging field. In this way, the NFC reader 102 will prevent the wireless charging circuitry from damaging the passive NFC device by outputting a charging field that the passive NFC device cannot safely endure.

Figure 2:
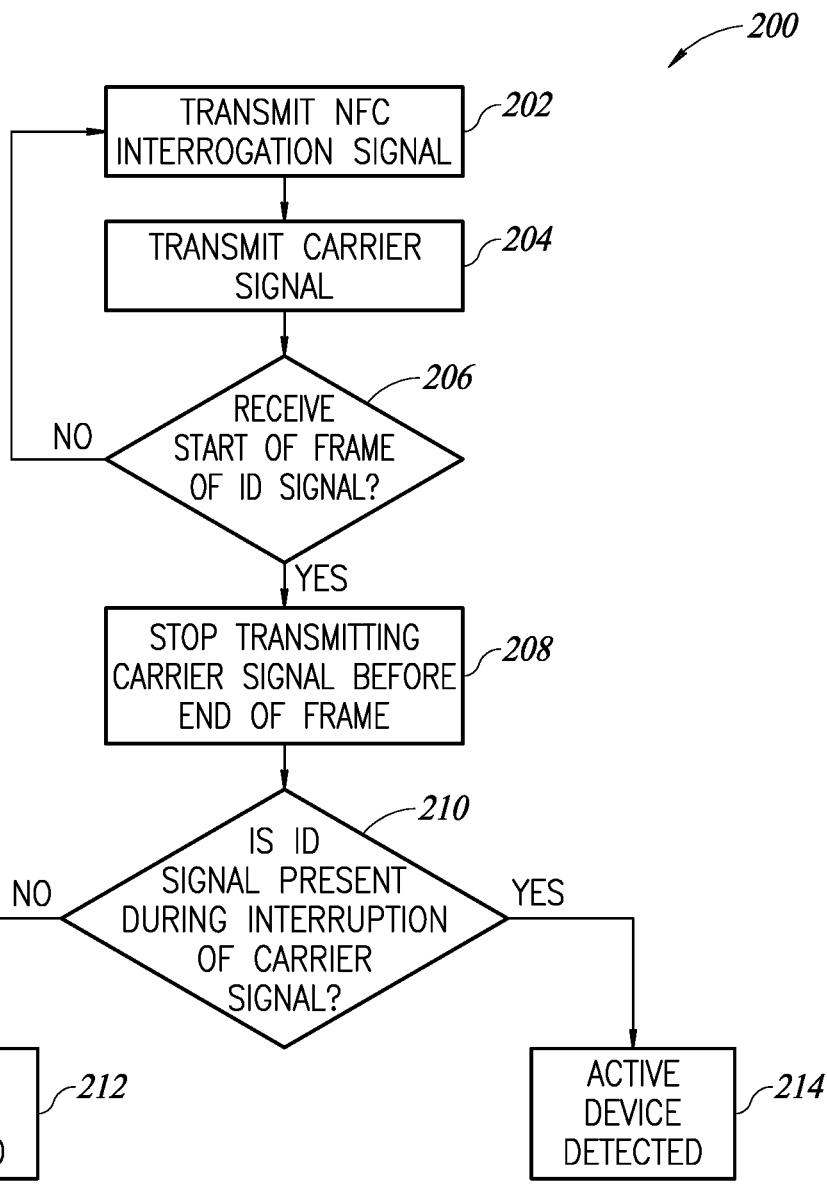
FIG. 2 is a flow diagram of a process for operating an NFC system, according to one embodiment.

FIG. 2 is a flow diagram of a process 200 for operating an NFC reader 102, according to one embodiment. At block 202 the NFC reader 102 outputs an NFC interrogation signal. The NFC interrogation signal is selected to induce a compatible NFC device 104 to respond to the NFC interrogation signal. The NFC interrogation signal is a radiofrequency signal that is modulated with interrogation data in accordance with one or more NFC protocols. From block 202, the process 200 proceeds to block 204.

At 204, the NFC reader 102 transmits a carrier signal 204. The carrier signal is a radiofrequency signal that is configured to provide power to a passive NFC device. In practice, the interrogation signal can be a modulation of the carrier signal. Thus, in one embodiment, transmitting the interrogation signal corresponds to modulating the carrier signal. At the conclusion of the interrogation signal, the NFC reader 102 transmits only the unmodulated carrier signal. From block 204, the process 200 proceeds to block 206.

At block 206 the NFC reader 102 listens for a response from an NFC device 104. The expected response can be an identification signal. The identification signal can identify the NFC device 104 or can merely identify that the NFC device 104 is present and operates in accordance with the protocol of the interrogation signal. If the NFC reader 102 receives the start of frame of the ID signal or response signal from the NFC reader 104, then the process proceeds to block 208. If the NFC reader 102 does not receive the start of frame of the ID signal or response signal from the NFC reader 104, then the process 200 returns to step 202.

At block 208, the NFC reader 102 stops transmitting the carrier signal before the end of frame is received from the NFC device 104. Accordingly, the NFC reader 102 stops transmitting the carrier signal before the NFC reader 102 has received the entirety of the ID signal or the response signal from the NFC device 104. In one embodiment, rather than entirely stopping transmission of the carrier signal, the NFC reader 102 reduces the power of the carrier signal to a level below which a passive NFC device cannot harvest sufficient energy to transmit the ID signal or other response signal. From block 208 the process 200 proceeds to block 210.

At block 210 the NFC reader 102 listens for the continuation of the ID signal or other response signal from the NFC device 104. If the NFC reader 102 does not continue to receive the ID signal or other response signal during the period of interruption of the carrier signal, then the process 200 proceeds to block 212. If the NFC reader 102 continues to receive the ID signal or other response signal during the period of interruption of the carrier signal, then the process proceeds to block 214.

At block 212, the NFC reader 102 determines that the NFC device 104 is a passive NFC device. Because the NFC device 104 is a passive NFC device powered by the carrier signal from the NFC reader 102, the interruption of the carrier signal 102 renders the NFC device 104 unable to transmit the identification signal or other response signal. Thus, the absence of the ID signal or response signal during the interruption of the carrier signal is a reliable indicator that the NFC device 104 is a passive NFC device.

At block 214, the NFC reader 102 determines that the NFC device 104 is an active NFC device. Because the NFC device 104 is an active NFC device powered by its own internal battery and not by the carrier signal, the interruption of the carrier signal does not interrupt the ability of the NFC device 104 to transmit the ID signal or other response signal. Thus, the presence of the ID signal or other response signal during the interruption of the carrier signal is a reliable indicator that the NFC device 104 is an active NFC device.

Figure 3:
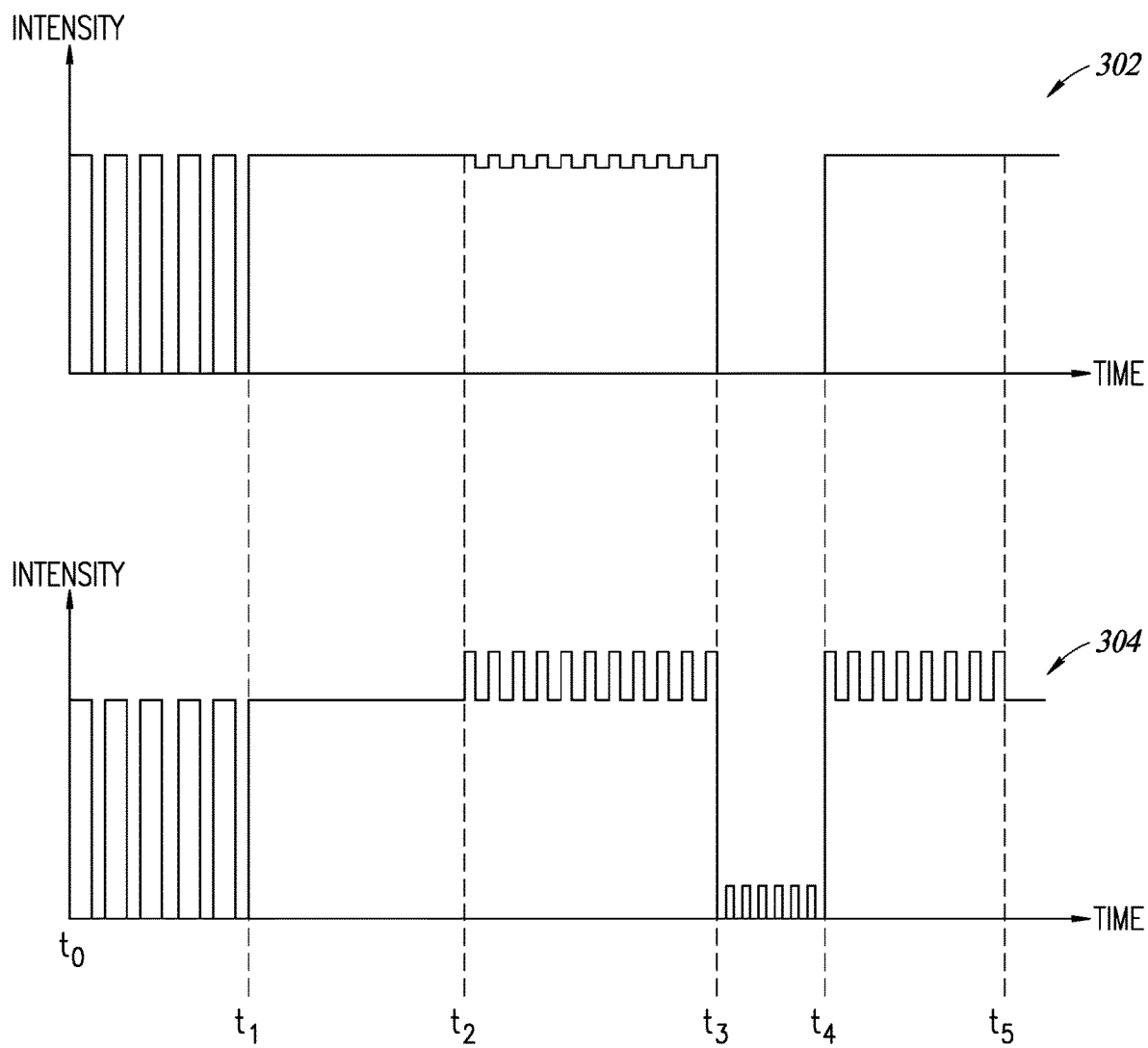
FIG. 3 illustrates a plurality of graphs of NFC signals, according to one embodiment.

FIG. 3 illustrates graphs 302 and 304 of NFC signals, according to one embodiment. Graph 302 represents the intensity of signals at an NFC transceiver of an NFC reader 102 when communicating with a passive NFC device during a selected period of time, according to one embodiment. Graph 304 represents the intensity of signals at an NFC transceiver of an NFC reader 102 when communicating with an active NFC device during a selected period of time, according to one embodiment.

With reference to graph 302, at time t0 the NFC reader 102 outputs an interrogation signal. The interrogation signal can correspond to the modulation of a radiofrequency signal. The radio signal can be the same signal as the carrier signal, but modulated to carry the data associated with an interrogation signal. The modulation of the interrogation signal is based on one or more NFC protocols. If an NFC device is present and operating in accordance with a protocol that is compatible with the protocol of the interrogation signal, then the interrogation signal will cause the NFC device to output a response signal.

The interrogation signal is transmitted on a radiofrequency signal. In one example, the radiofrequency signal is 13.56 MHz, a common frequency designated for some NFC applications. Other frequencies for an NFC radiofrequency signal can be used without departing from the scope of the present disclosure.

At time t1, the NFC reader 102 has completed transmission of the interrogation signal. At time t1, the NFC reader 102 outputs a carrier signal. The carrier signal is a radiofrequency signal selected to provide power for passive NFC devices. The carrier signal may be the same signal or have the same frequency as a signal that carries the data for the interrogation signal. In one embodiment, the carrier signal carries the interrogation signal. The interrogation signal corresponds to a modulation of the carrier signal to encode the carrier signal data. The NFC reader 102 may also output the carrier signal prior to time t0 to energize passive NFC devices prior to transmitting the interrogation signal.

In the example of the graph 302, the NFC device 104 is a passive NFC device. The passive NFC device is powered by energy harvested from the carrier signal output by the NFC reader 102. Accordingly, the NFC device 104 receives the interrogation signal and harvests energy from the carrier signal.

At time t2, the passive NFC device begins outputting an ID signal by modulating a load of the antenna coil of the passive NFC device. This impedance modulation is echoed by inductive coupling in the impedance of an antenna coil of the NFC reader 102. The NFC reader 102 can extract from its antenna signal the load modulation signal used by the passive NFC device. A device identification is stored in a memory in the passive NFC device. Upon receiving an appropriate interrogation signal, the passive NFC device automatically modulates the impedance of its antenna coil in accordance with the identification of the passive NFC device. The passive NFC device can, alternatively, output a signal other than an identification signal responsive to the interrogation signal.

At time t2 the NFC reader 102 begins to receive the identification signal from the passive NFC device. The beginning of the identification signal corresponds to the start of frame of the identification signal. The frame corresponds to the entirety of the expected identification signal. The frame has a length in accordance with an NFC protocol associated with the passive NFC device.

Referring to the graph 302, At t3, after the NFC reader 102 receives the start of frame of the identification signal, the NFC reader 102 interrupts or stops transmitting the carrier signal. At t4 the NFC reader 102 resumes transmitting the carrier signal. The timing of t3 and t4 are selected so that the interruption occurs between the start of frame of the identification signal and the end of frame of the identification signal. Time t5 corresponds to the end of frame of the identification signal. Accordingly, the NFC reader 102 interrupts or stops transmitting the carrier signal for a selected duration between the start of frame and the end of frame of the identification signal.

At t3 the passive NFC device stops modulating the impedance of its antenna coil, and thus stops transmitting the identification signal. This occurs because the passive NFC device is powered by the carrier signal. When the carrier signal is interrupted at t3, the passive NFC device is no longer able to harvest energy from the carrier signal. The passive NFC device stops transmitting the identification signal because no energy is available to power the passive NFC device in the absence of the carrier signal.

Accordingly, at time t3 there is no signal at the transceiver or antenna coil of the NFC reader because the NFC reader 102 has stopped transmitting the carrier signal and the passive NFC has in turn stopped modulating the impedance of its antenna coil. The NFC reader 102 is able to determine that the NFC device 104 is a passive NFC device in the case illustrated by the graph 302. This is because during the interruption of the carrier signal, the NFC reader 102 continues listening for the identification signal. If the NFC reader 102 does not receive the identification signal during the interruption of the carrier signal, then the NFC reader 102 can determine that the NFC device 104 is a passive NFC device.

The graph 302 demonstrates an embodiment in which the carrier signal 102 is stopped entirely between times t3 and t4. However, in one embodiment, the NFC reader 102 does not entirely stop transmission of the carrier signal during the testing period between t3 and t4. Instead, the NFC reader 102 can decrease the power of the carrier signal to a level below which the passive NFC device can harvest sufficient energy to power provide the identification signal, in which case the passive NFC device is unable to provide the identification signal between t3 and t4. Accordingly, the NFC reader can adjust the carrier signal between t3 and t4 by either entirely ceasing transmission of the carrier signal between t3 and t4 or by reducing the amplitude or power of the carrier signal between t3 and t4.

At time t4 the NFC reader 102 resumes transmission of the carrier signal. In the example illustrated in the graph 302, the passive NFC device does not resume providing the identification signal at t4. However, in alternative examples the passive NFC device may resume providing the identification signal at t4 if the interruption of the carrier signal is sufficiently short that the passive NFC device does not enter an error state during interruption of the carrier signal. In this case, the duration of the interaction of the care signal is chosen so that the passive NFC device does not enter an error state.

In one embodiment, the duration of the interrogation signal is between 60 µs and 80 µs. In one embodiment, the delay between transmission of the interrogation signal and reception of the start of frame of the identification signal is between 70 µs and 100 µs. In one embodiment, the expected duration of the identification signal, or the frame, is between 140 µs and 200 µs. In one embodiment, the delay between receiving the start of frame and interrupting the carrier signal is between 10 µs and 100 µs. In one embodiment, the duration of the interruption of the carrier signal is between 5 µs and 30 µs. Those of skill in the art will recognize, in light of the present disclosure, that other values for the timing of the various signals can be utilized without departing from the scope of the present disclosure.

The graph 304 illustrates an example in which the NFC device 104 is an active NFC device. The NFC reader 102 outputs the interrogation signal between times t0 and t1 and begins outputting the carrier signal at t1. At time t2 the active NFC device begins transmitting an identification signal responsive to receiving the interrogation signal. The identification signal can include an identification or other information regarding the active NFC device. In one embodiment, at t2 the active NFC device transmits a response signal other than an identification signal in response to receiving the interrogation signal.

At time t2, the NFC reader receives the start of frame of the identification signal. At time t3 the NFC reader 102 interrupts transmission of the carrier signal. During the interruption of the carrier signal, the NFC reader 102 listens for the continued transmission of the identification signal.

During the interruption of the carrier signal between times t3 and t4, the active NFC device continues to transmit the identification signal as is demonstrated in the graph 304 in which there is still some signal at the NFC transceiver of the NFC reader 102 between times t3 and t4. This is because the active NFC device is not powered by the carrier signal. Instead, the active NFC device has its own power source, such as a battery, that powers transmission of the identification signal. Accordingly, when the carrier signal is interrupted between times t3 and t4, the identification signal is not disrupted.

Between times t3 and t4, the NFC reader 102 continues to receive the identification signal. The NFC reader 102 can determine that the NFC device 104 is an active NFC device. The NFC reader 102 receives the entire frame of the identification signal. The entire frame of the identification signal corresponds to the times t2 to t5.

Figure 4:
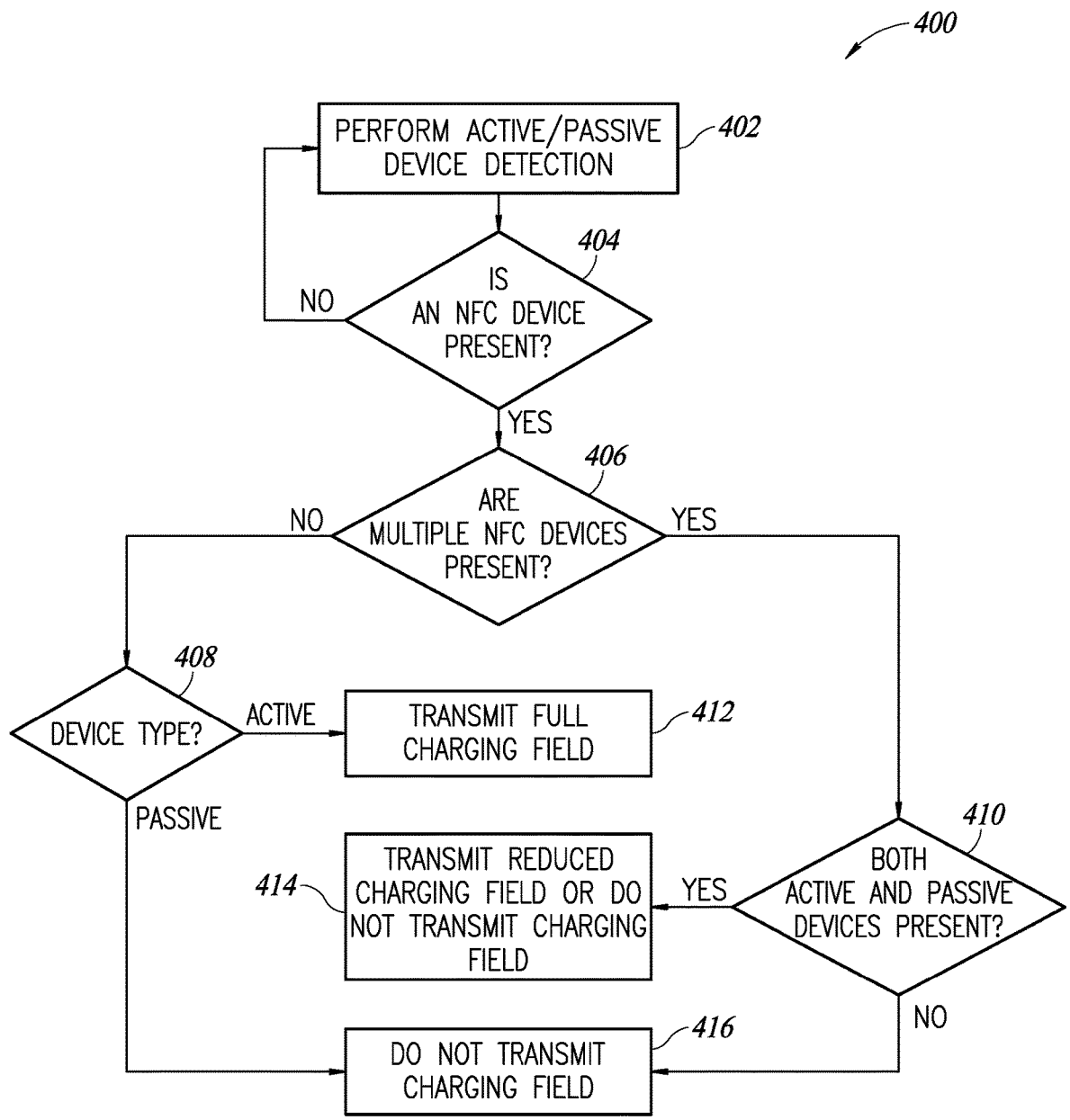
FIG. 4 is a flow diagram of a process for operating an NFC system, according to one embodiment.

FIG. 4 is a flow diagram of a process 400 for operating an NFC reader, according to one embodiment. At block 402, an NFC reader 102 performs a process to determine whether an active him NFC device him or a passive NFC device is present. If an NFC device is detected, block 402 can include performing the active/passive NFC device determination processes described in relations to FIGS. 1-3, including interrupting or otherwise adjusting a carrier signal during reception of an identification signal from an NFC device. If multiple NFC devices are present, block 402 can include performing the active/passive NFC device determination processes for each NFC device that is present. From block 402, the process proceeds to block 404.

At block 404, if no NFC device is present, then the process returns to block 402. At block 404, if an NFC device is present, then the process proceeds to block 406.

At block 406 if only a single NFC device is present, then the process proceeds to block 408. At block 406 if multiple NFC devices are present, then the process proceeds to block 410.

At block 408 if the single NFC device is an active NFC device, then the process proceeds to block 412. At block 408 if the single NFC device is a passive NFC device, then the process proceeds to block 416.

At block 412, wireless charging circuitry transmits a full charging field responsive to the NFC reader 102 identifying the presence of a single active NFC device. The charging field charges the single active NFC device that is present. In particular, the charging field recharges a battery of the active NFC device. The wireless charging circuitry can transmit the charging field at full strength because there is no passive NFC device present that could be damaged by a full strength charging field. Accordingly, at block 412, the wireless charging circuitry can safely recharge the battery of the active NFC device without risk of harming a passive NFC device.

At block 416, the wireless charging circuitry does not transmit a charging field because the only device present is the passive NFC device. There is no need to transmit a charging field because the passive NFC device does not have a battery that can be recharged. Accordingly, when a single NFC device is present, the NFC reader 102 determines whether a charging field should be provided from the wireless charging circuitry based on the reliable determination of the type of the NFC device.

At block 410 if there are both active and passive NFC devices present, then the process proceeds to block 414. If there are only passive NFC devices present, then the process proceeds to block 416.

At block 414 the wireless charging circuitry either transmits a reduced charging field or does not transmit the charging field. Rather than transmitting a charging field at full strength, the wireless charging circuitry can transmit a charging field at a reduced strength. The reduced strength of the charging field is selected so that the passive NFC device that is present will not be harmed by the strength of the charging field. In one example, the wireless charging circuitry outputs the charging field at half strength at block 414. The power level of the charging field can be determined based on the known robustness of typical passive NFC devices. The reduced charging field recharges the battery of the active NFC device that is present. The reduced charging field may not recharge the battery of the active NFC device as quickly as would the full charging field. However, the reduced strength of the field ensures that the passive NFC device will not be harmed while the active NFC device will still be recharged. Alternatively, the wireless charging circuitry may refrain from outputting any charging field at all at block 414 to avoid the possibility of damaging the passive NFC device.

Figure 5:
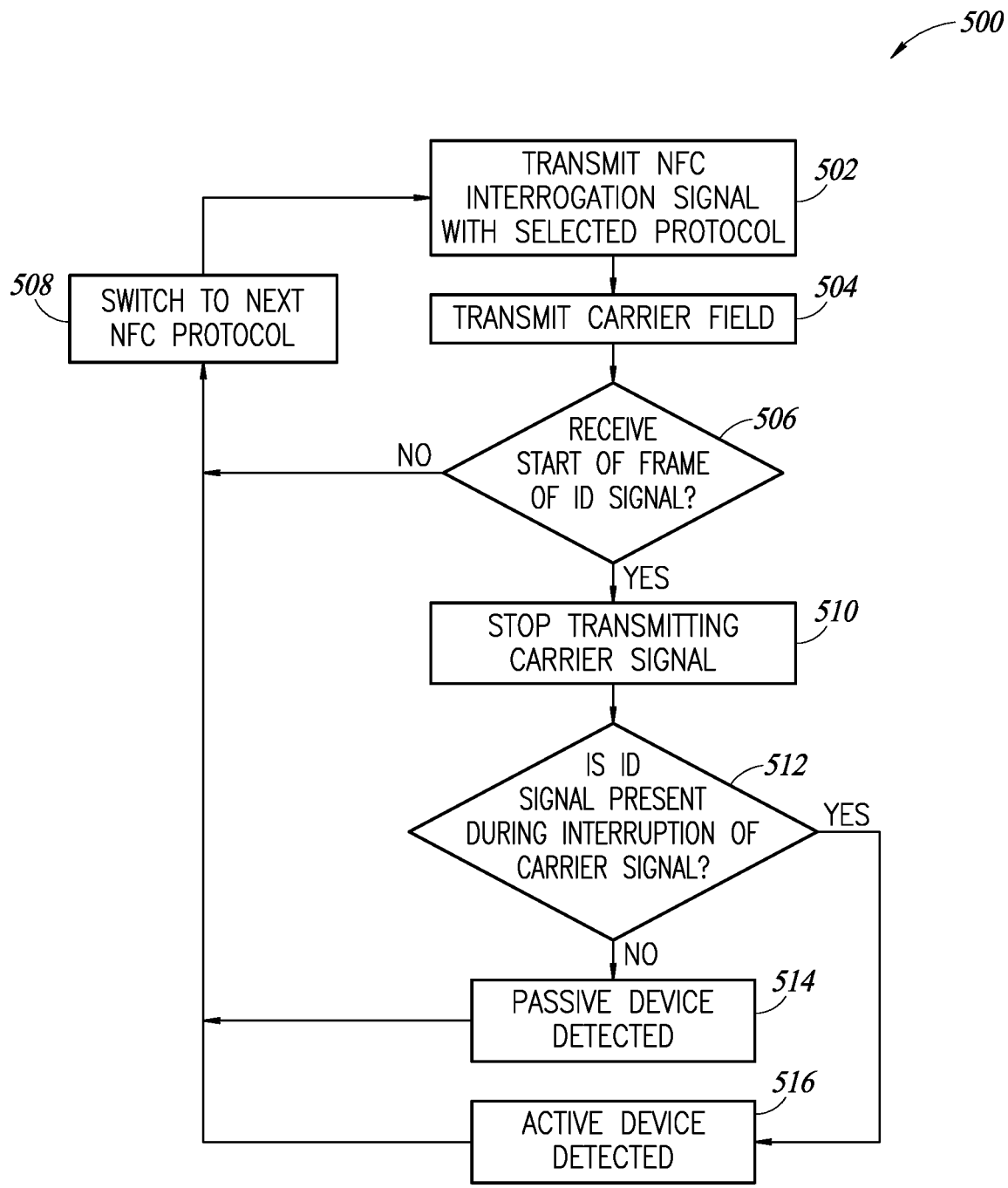
FIG. 5 is a flow diagram of a process for operating an NFC system, according to one embodiment.

FIG. 5 is a flow diagram 500 of a process for operating an NFC reader 102, according to one embodiment. At block 502 the NFC reader 102 transmits an interrogation signal with a selected protocol. As set forth previously, there are multiple NFC signaling protocols by which NFC readers and NFC devices can communicate with each other. Typically, an NFC device 104 will operate with one particular NFC protocol. In order for the NFC reader 102 to communicate with the NFC device 104, the NFC reader 102 needs to broadcast an interrogation signal that is compatible with the protocol of the NFC device 104.

The NFC reader 102 is capable of operating with a plurality of NFC protocols. The NFC reader 102 can select one protocol from a plurality of protocols and can transmit the interrogation signal in order to detect and communicate with a nearby NFC device 104 that operates on that protocol. If an NFC device 104 is within range and operates on the currently selected protocol, then the NFC device 104 can respond with an identification signal or another type of signal.

In one embodiment, the NFC reader 102 is capable of communicating with NFC protocols ISO/IEC 14443-A (type A), ISO/IEC 14443-B (type B), and FeliCA JIS X6319-4 (type F). The NFC reader 102 can communicate on other protocols than these without departing from the scope of the present disclosure.

At block 504 the NFC reader 102 transmits the carrier field. Transmitting the carrier field can include continuing to transmit a field that carried the interrogation signal, but without modulation. Alternatively, transmitting the carrier field can include transmitting another type of field. The carrier field is selected to enable a passive NFC device to harvest energy from the carrier field. From block 504 the process 500 proceeds to block 506.

At block 506 if the NFC reader 102 has not received the start of frame of an ID signal from an NFC device 104, then the process proceeds to block 508. At block 506 if the NFC reader has received the start of frame of an ID signal from an NFC device 104, then the process proceeds to block 510.

At block 508 the NFC reader 102 switches from the current NFC protocol to a next NFC protocol. From block 508 the process proceeds to block 502. At block 502 the NFC reader 102 again transmits an interrogation signal with the next selected NFC protocol. The NFC reader 102 can cycle through NFC protocols repeatedly until an NFC device 104 responds to the interrogation signal.

At block 510 the NFC reader 102 has received the start of frame of an ID signal at block 506. The NFC reader 102 stops transmitting the carrier signal after receiving the start of frame of the ID signal using any of the processes or procedures described previously in relation to FIGS. 1-4. From block 510, the process 500 proceeds to block 512.

At block 512 the NFC reader 102 listens to detect the presence of the ID signal from the NFC device 104 during the interruption to the carrier signal. If the ID signal is not present during the interruption of the carrier signal, then the process proceeds to block 514. If the ID signal is present during the interruption of the carrier signal, then the process proceeds to block 516.

At block 514 the NFC reader 102 determines that the NFC device 104 is a passive NFC device. This is because the passive NFC device is not able to transmit the ID signal during the absence of the carrier signal. From block 514 the process proceeds to block 508. At block 508 the NFC reader 102 switches to the next NFC protocol in order to communicate with an NFC device that operates on the next protocol.

At block 516 the NFC reader 102 determines that the NFC device 104 is an active NFC device. This is because the active NFC device is able to continue outputting the ID signal in the absence of the carrier signal because the active NFC device is powered by a power source other than the carrier signal. At block 508 the NFC reader 102 switches to the next NFC protocol in order to communicate with an NFC device that operates on the next protocol.

Figure 6:
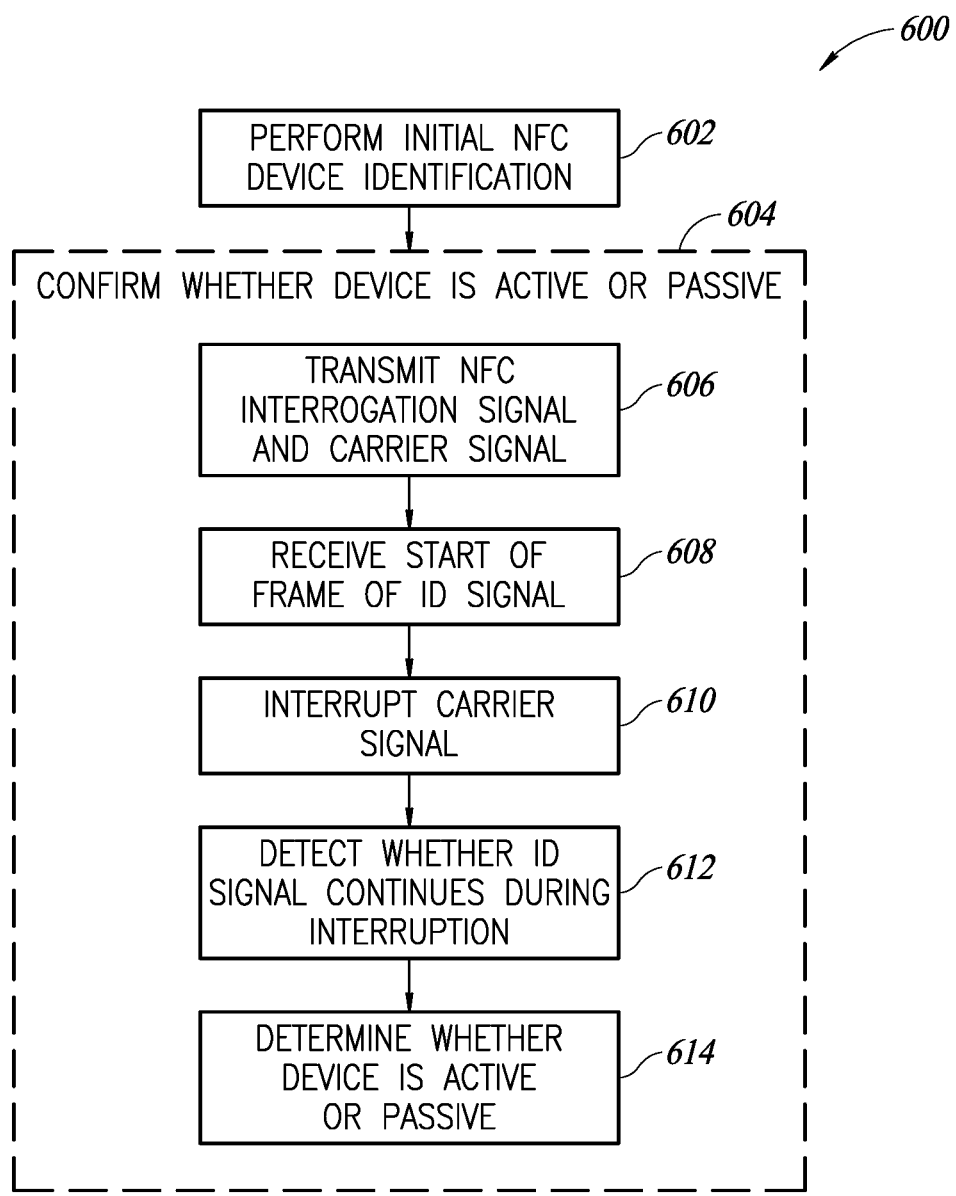
FIG. 6 is a flow diagram of a process for operating an NFC system, according to one embodiment.

FIG. 6 is a flow diagram of a process 600 for operating an NFC reader 102, according to one embodiment. At block 602, the NFC reader performs an initial NFC device identification. The NFC reader 102 outputs an initial interrogation signal in accordance with a selected NFC protocol. If a compatible NFC device 104 is in range, the NFC device 104 will respond to the initial interrogation signal with an identification signal. The NFC device 104 receives the entirety of the identification signal.

The identification signal may indicate that the NFC device 104 is a passive NFC device or an active NFC device. In either case the NFC reader 102 may perform an additional test to reliably determine wither the NFC device 104 is a passive NFC device or an active NFC device.

Accordingly, after the NFC reader 102 has initially established communication with an NFC device at block 602, the NFC reader 102 restarts communication with the NFC device 104 at block 604 in order to conclusively determine whether the NFC device 104 is an active NFC device or a passive NFC device. Block 604 includes blocks 606, 608, 610, 612, and 614.

At block 606 the NFC reader 102 transmits in interrogation signal using the protocol with which the NFC reader 102 previously established communication with the NFC device 104. After transmitting the interrogation signal, the NFC device 102 transmits the carrier signal. From block 606 the process proceeds to block 608.

At block 608 the NFC reader 102 receives the start of frame of the identification signal from the NFC device. After receiving the start of frame of the identification signal from the NFC device 104, the process proceeds to block 610.

At block 610 the NFC reader 102 interrupts the carrier signal. Interrupting the carrier signal can include stopping the carrier signal entirely for reducing the power or amplitude of the carrier signal to a level at which a passive NFC device is not able to harvest sufficient energy to continue transmitting the interrogation signal. From block 610 the process proceeds to block 612.

At block 612 the NFC reader 102 detects whether the ID signal continues during the interruption of the carrier signal. From block 612 the process proceeds to block 614.

At block 614 the NFC reader 102 determines whether the NFC device is a passive NFC device or an active NFC device. If the identification signal continues during the interruption of the carrier signal, then the NFC reader 102 determines that the NFC device 104 is an active NFC device. If the identification signal does not continue during the interruption of the carrier signal, then the NFC reader 102 determines that the NFC device 104 is a passive NFC device.

The process 600 can include repeating the steps at different protocols to establish communication with and determine the device type of any other NFC devices 104 in range of the NFC reader 104.

Figure 7:
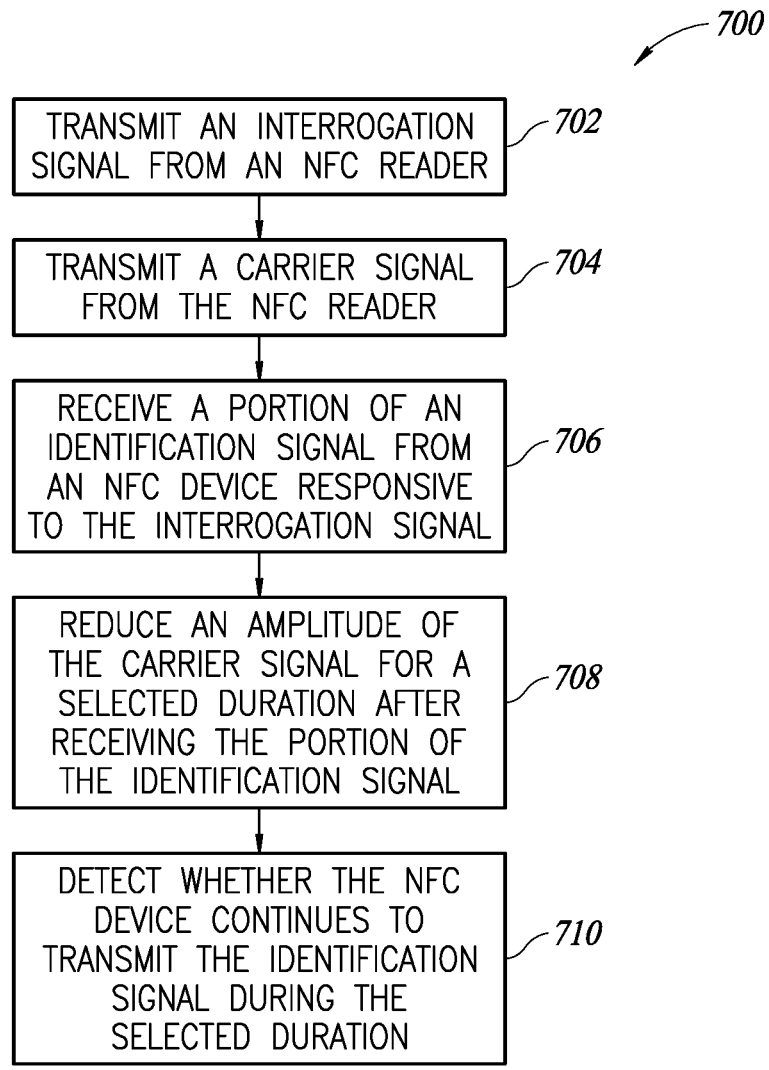
FIG. 7 is a flow diagram of a process for operating an NFC system, according to one embodiment.

FIG. 7 is a flow diagram of a method for operating an NFC reader, according to one embodiment. At 702, the method 700 transmits an interrogation signal from an NFC reader. At 704 the method 700 includes transmitting a carrier signal from the NFC reader. At 706 the method 700 includes receiving a portion of an identification signal from an NFC device responsive to the interrogation signal. At 708 the method includes reducing an amplitude of the carrier signal for a selected duration after receiving the portion of the identification signal. At 710 the method 700 includes detecting whether the NFC device continues to transmit the identification signal during the selected duration.

Figure 8:
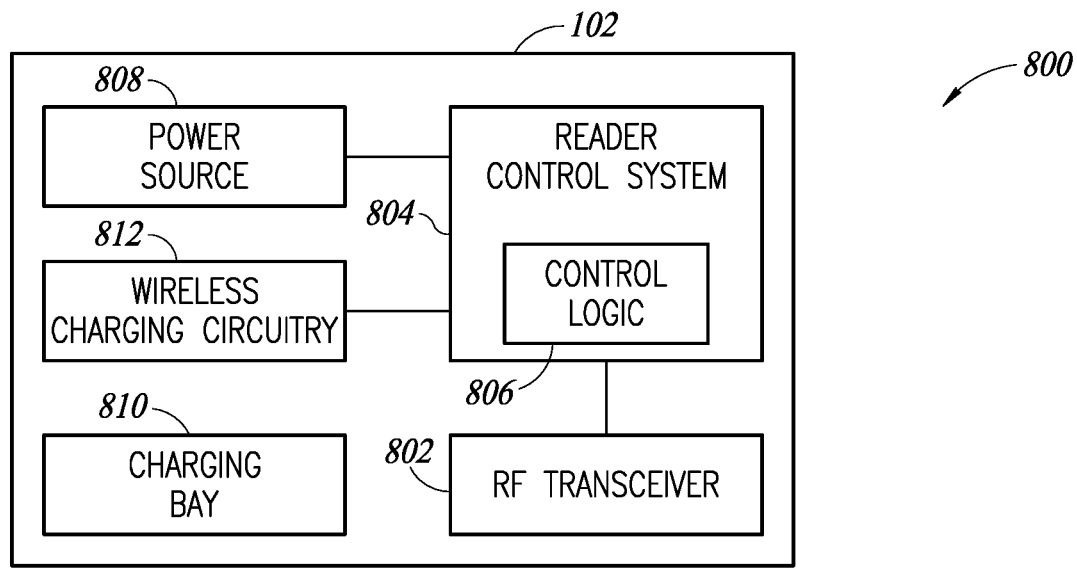
FIG. 8 is a block diagram of an NFC system, according to one embodiment.
Figure 8:
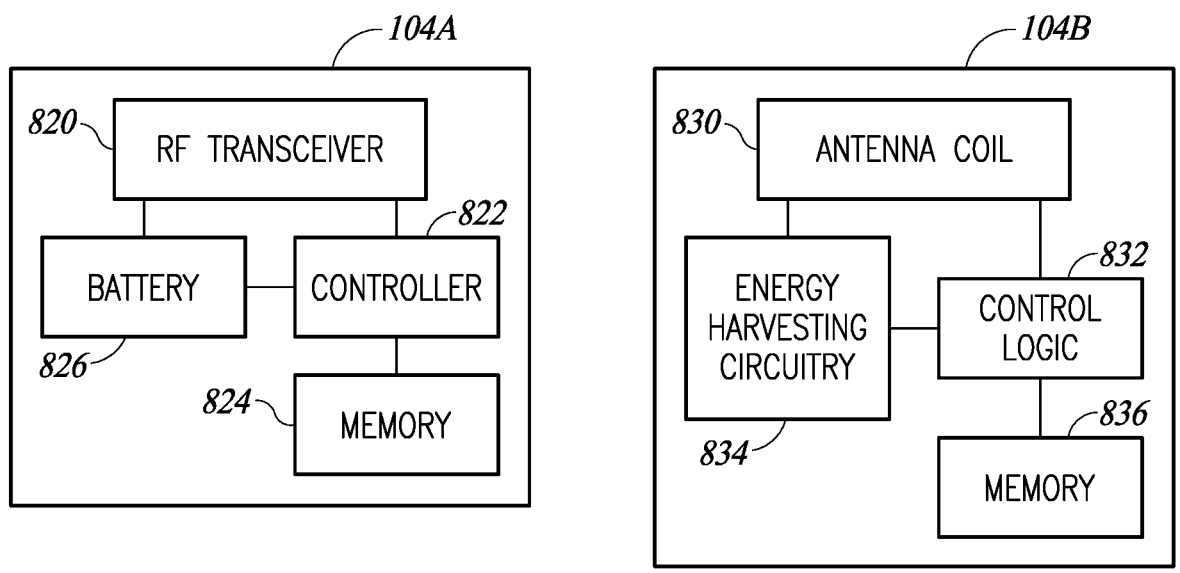

FIG. 8 is a block diagram of an NFC communication system 800, according to one embodiment. The NFC communication system 100 includes an NFC reader 102, and active NFC device 104A, and a passive NFC device 104B. The NFC reader 102 communicates via NFC communication protocols with the active NFC device 104A and the passive NFC device 104B.

The NFC reader 102 includes an RF transceiver 802, a reader control system 804, a power source 808, a charging bay 810, and wireless charging circuitry 812. The reader control system includes control logic 806. The components of the NFC reader 102 to cooperate together to provide NFC communication and separate wireless charging.

The RF transceiver 802 enables the NFC reader 102 to transmit signals and to receive signals. The RF transceiver 802 can include one or more antennas for transmitting NFC signals and for receiving NFC signals. The RF transceiver 802 can include additional circuitry for enabling the RF transceiver 802 to transmit signals including interrogation signals, carrier signals, and other types of signals. The RF transceiver 802 can include additional circuitry for enabling the RF transceiver 802 to receive and process signals including interrogation signals and other types of signals from the active NFC device 104A and the passive NFC device 104B.

The reader control system 804 includes control circuitry for controlling the function of the NFC reader 102. The reader control system 804 controls the operation of the RF transceiver 802. The reader control system 804 controls the transmission of signals with the RF receiver 802. The reader control system 804 also controls the reception of signals with the RF receiver 802. The reader control system 804 can include processing resources, memory resources, and data transmission resources.

The control system 804 includes the control logic 806. The control logic 806 can include instructions for operation of the control system 804. The control logic 806 can include instructions protocols for performing the operations, processes, and methods executed by the NFC reader 102, including those described herein. The control logic 806 can correspond to software instructions stored in a memory of the NFC reader 102.

The power source 808 provides power to the NFC reader 102. The power source 808 can include one or more of an internal battery, a wired power connection to an external power source, and a wireless power connection to an external power source.

The wireless charging circuitry 812 selectively provides a wireless charging field based on whether the types of NFC devices that are present as determined by the NFC reader 102. The wireless charging circuitry 812 includes an antenna that is separate from an NFC communication antenna of the NFC reader 102 and does not operate in accordance with NFC communication frequencies and protocols. Thus, the NFC reader 102 may be a device that includes both NFC communication circuitry and separate wireless charging circuitry.

In one embodiment, the wireless charging circuitry 812 operates in accordance with a Qi wireless charging standard. The Qi wireless charging circuitry outputs a charging field in a range between 87 kHz and 205 kHz. NFC signals typically Accordingly, the charging field is not transmitted with the frequency of NFC communicate at a frequency of 13.56 MHz. Accordingly, the Qi charging field is outside a range of NFC communication signals.

The wireless charging circuitry 812 of the NFC reader 102 can be controlled by its own control logic, by the control logic 806 of the reader control system 804, or by other control systems. The wireless charging circuitry selectively outputs the wireless charging field based on the types of NFC devices present as detected by the reader control system 804.

The charging bay 810 includes a physical area on which an active NFC device 104A can be positioned in order to receive wireless charging signals from the NFC reader 102. When an active NFC device 104A is positioned on the charging bay 810, the NFC reader 102 detects that the NFC device 104A is an active NFC device and causes the charging field circuitry 812 to begin outputting the wireless charging field.

In one embodiment, positioning either or both of the passive NFC device 104A and the passive NFC device 104B on the charging bay 110 causes the NFC reader 102 to establish communication with and determine the types of the NFC devices as described herein. The wireless charging circuitry 812 can then output the full charging field, output the reduced charging field, or refrain from outputting the charging field.

The active NFC reader 104A includes an RF transceiver 820, a controller 822, a memory 824, and a battery 826. The RF transceiver 820 includes one or more antennas and other RF circuitry for receiving signals from the NFC reader 102 and for outputting signals to the NFC reader 102.

The controller 822 controls the operation of the RF transceiver 820. The controller 822 can include processing resources for signal processing, for controlling the RF transceiver 820, and for reading data from and for writing data to the memory 824.

The memory 824 can store software instructions for the operation of the active NFC device 104. The memory 824 can store data including the identification and other parameters associated with the active NFC device 104A.

The battery 826 provides power to the components of the active NFC device 104A. Because the active NFC device 104A includes the battery 826, the active NFC device 1028 does not need to harvest energy from the carrier signal transmitted by the NFC reader 102 in order to transmit signals to the NFC reader 102.

The passive NFC device 104B includes an antenna coil 830, control logic 832, energy harvesting circuitry 834, and memory 836. The antenna coil includes one antennas and other circuitry for receiving signals from the NFC reader 102 and for providing signals to the NFC reader 102.

The control logic 832 controls the operation of the antenna coil 830. The control logic 830 controls the modulation of output of signals from the antenna coil 830 responsive to interrogation signals received from the NFC reader 102. The control logic 830 controls modulation of an impedance of the antenna coil 830. The memory 836 stores identification data related to the passive NFC receiver 104B.

When the antenna coil 830 receives signals from the NFC reader 102, the energy harvesting circuitry 834 harvests energy from the signals. The energy harvesting circuitry 834 powers the control logic with energy harvested from the signals. When the antenna coil 830 receives an interrogation signal from the NFC reader 102, the control logic retrieves identification data from the memory 836 and causes the antenna coil to provide the identification signal including the identification data by modulating the impedance of the antenna coil 830 in accordance with well understood techniques. If the carrier field is not present, the passive NFC device 104B cannot provide the identification signal.

Figure 9:
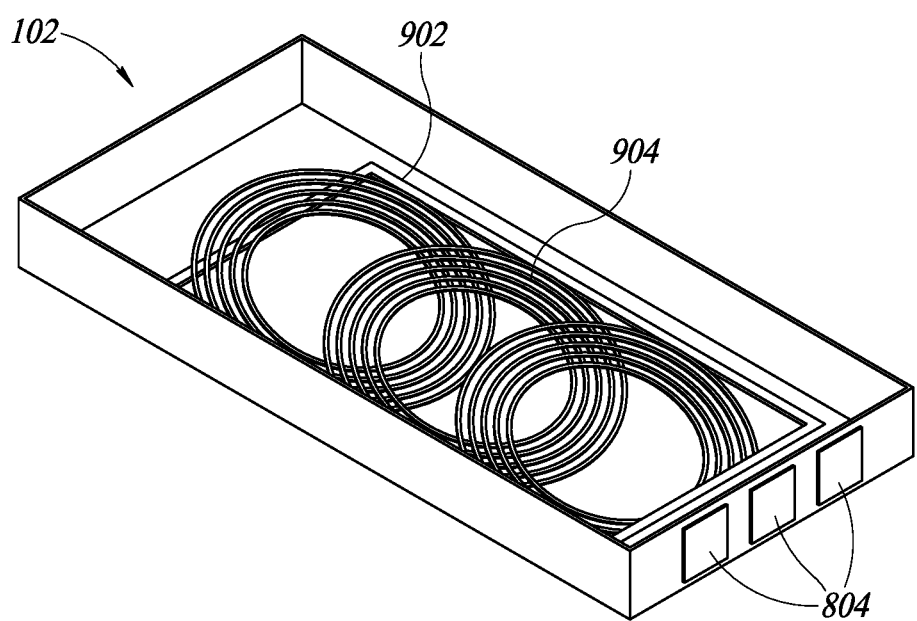
FIG. 9 is an illustration of an NFC reader, according to one embodiment.

FIG. 9 is an illustration of circuitry of an NFC reader 102, according to one embodiment. The NFC reader 102 includes an NFC antenna coil 902, a wireless charging antenna coil 904, and a reader control system 804. The NFC antenna coil 902 is part of an RF transceiver 802 by which the NFC reader 102 implements NFC communication with NFC devices. The wireless charging coil 904 is part of wireless charging circuitry 812 by which the NFC reader 102, or an electronic device of which the NFC reader 102 is part, provides a wireless charging field. The reader control system 804 controls the RF antenna coil and the wireless charging coil, in one embodiment. Parts of the wireless charging circuitry 812 may be included in the reader control system 804. The wireless charging circuitry 812 may, alternatively, be controlled by a separate control system. In one embodiment, the wireless charging antenna coil 904 is a Qi standard wireless charging coil.

Figure 10:
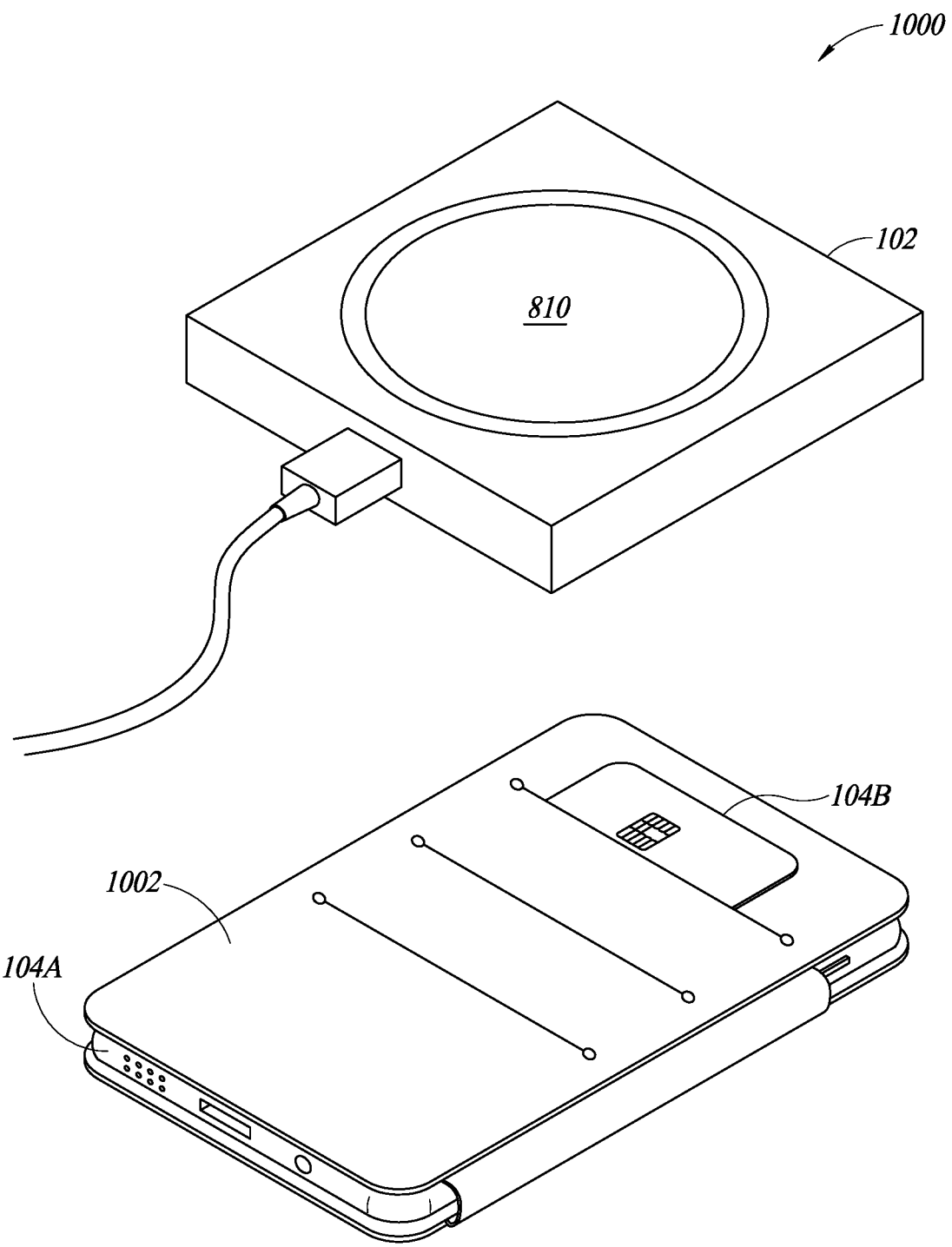
FIG. 10 is an illustration of an NFC system, according to one embodiment.

FIG. 10 is an illustration of an NFC communication system 1000, according to one embodiment. The NFC communication system 1000 includes an NFC reader 102, an active NFC device 104A, and the passive NFC device 104B. The NFC reader 102 communicates with the active NFC device 104A and the passive NFC device 104B the NFC protocols.

In the example of FIG. 10, the active NFC device 104A is a smart phone with active NFC circuitry. In the example of FIG. 10, the passive NFC device 104B is a credit card with passive NFC circuitry. The smart phone includes a protective case 1002. The protective case 1002 includes several slots for holding cards of various types. The credit card is positioned in one of the slots of the protective case 1002. This is a common configuration that enables people to carry their identification and credit cards with their smart phone.

The NFC reader 102 includes a charging bay 810. A user can place the smart phone 104A on the charging bay. The NFC reader 102 can communicate with the smart phone 104 via NFC protocols. The NFC reader 102 can charge the battery of the smart phone when the smart phone is positioned on the charging bay 810.

Because the credit card 104B is a passive NFC device including passive NFC circuitry, it is possible that a fully powered charging field could damage the NFC circuitry of the credit card 104B. Thus, when the credit card 104B is positioned in the protective case 1002 of the smart phone 104A and the smart phone 104A is positioned on the charging bay 810, it is possible that a fully powered charging field could damage the NFC circuitry of the credit card 104B.

When the smart phone 104A is positioned on the charging bay 810, the NFC reader 102 outputs interrogation signals and listens for responses on the various NFC protocols. In this way, the NFC reader 102 establishes communication with both the smart phone 104A and the credit card 104B.

After identifying both the smart phone 104A and the credit card 104B, the NFC reader 102 performs a process for conclusively determining the NFC type of both the smart phone 104A and the credit card 104B. In particular, the NFC reader 102 transmits an interrogation signal with the protocol of the smart phone 104A. When the NFC reader 102 receives the start of the identification or response signal from the smart phone 104A, the NFC reader 102 interrupts the carrier signal. During the interruption of the carrier signal, the NFC reader 102 listens for the identification signal. The NFC reader 102 detects the identification signal from the smart phone 104A during the interruption of the carrier signal. The NFC reader 102 determines that the smart phone 104A is an active NFC device.

The NFC reader 102 then outputs an interrogation signal on the protocol of the credit card 104B. When the NFC reader 102 receives the start of the identification or response signal from the credit card 104B, the NFC reader 102 interrupts the carrier signal. During the interruption of the carrier signal, the NFC reader one listens for the identification signal. The NFC reader 102 does not receive the identification signal during the interruption of the carrier signal. The NFC reader one determines that the credit card 104B is a passive NFC device.

Because the NFC reader one has detected that there is both a passive NFC device and an active NFC device present, the wireless charging circuitry 812 outputs a charging field with a reduced amplitude or power. The power of the charging field is selected to not damage the NFC circuitry of the credit card 104B. The charging field charges the battery of the smart phone 104A.

If the NFC reader 102 detects an active NFC device only, the wireless charging circuitry 812 can output a full powered charging field to charge the battery of the active NFC device. If the NFC reader one detects only a passive NFC device, the wireless charging circuitry 812 will not output any charging field.

FIG. 10 illustrates an embodiment in which an active NFC device is a smart phone and a passive NFC device is an NFC enabled credit card. However, other types of active and passive NFC devices can be utilized without departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method comprising:
   transmitting an interrogation signal from a near field communication reader;
   transmitting a carrier signal from the near field communication reader;
   receiving a portion of an identification signal from a near field communication device responsive to the interrogation signal;
   reducing an amplitude of the carrier signal for a selected duration after receiving the portion of the identification signal and prior to receiving an entirety of the identification signal; and
   detecting whether the near field communication device continues to transmit the identification signal during the selected duration.

2. The method of claim 1, further comprising determining whether the near field communication device is an active load modulation near field communication device based on whether the near field communication device continues to transmit the identification signal during the selected duration.

3. The method of claim 2, further comprising determining whether the near field communication device is a passive load modulation near field communication device based on whether the near field communication device ceases to transmit the identification signal during the selected duration.

4. The method of claim 2, further comprising outputting a wireless charging signal after the selected duration if the near field communication device is an active load modulation near field communication device.

5. The method of claim 2, further comprising:
   outputting a first wireless charging signal after the selected duration if the near field communication device is an active load modulation near field communication device and there is no passive load modulation device detected by the near field communication reader; and
   outputting a second wireless charging signal after the selected duration if the near field communication device is an active load modulation near field communication device and the near field communication reader detects a passive load modulation device nearby, wherein the second wireless charging signal is less powerful than the first charging signal.

6. The method of claim 2, further comprising:
   outputting a wireless charging signal after the selected duration if the near field communication device is an active load modulation near field communication device; and
   selectively withholding transmission of the wireless charging signal after the selected duration if the near field communication device is a passive modulation device.

7. The method of claim 1, wherein reducing the amplitude of the carrier signal includes ceasing output of the carrier signal during the selected duration.

8. The method of claim 1, wherein reducing the amplitude of the carrier signal includes reducing the amplitude of the carrier signal below a passive modulation threshold representing a threshold below which the carrier signal does not adequately power a passive load modulation near field communication device.

9. The method of claim 1, further comprising resuming transmission of the carrier signal after the selected duration, the selected duration is less than an expected duration of the identification signal.

10. A near field communication reader, comprising:
    a radiofrequency transceiver configured to transmit and receive near field communication signals; and
    a control system coupled to the radiofrequency transceiver and configured to cause the radiofrequency transceiver to output an interrogation signal, to output a carrier signal, cause the radiofrequency transceiver to reduce an amplitude of the carrier signal for a selected duration in response to receiving a portion of an identification signal from a near field communication device responsive to the interrogation signal, and detect whether the near field communication device continues to transmit the identification signal during the selected duration.

11. The near field communication reader of claim 10, wherein the control system is configured to determine whether the near field communication device is an active near field communication device or a passive near field communication device based on whether the identification signal continues during the selected duration.

12. The near field communication reader of claim 11, further comprising a memory including software instructions for determining whether the near field communication device is an active near field communication device or a passive near field communication device.

13. The near field communication reader of claim 12, wherein the control system includes one or more processors communicatively coupled to the memory and configured to execute the software instructions.

14. The near field communication reader of claim 11, further comprising wireless charging circuitry, wherein the control system is configured cause the wireless charging circuitry to output a charging field for recharging a battery of the near field communication device if the near field communication device is an active near field communication device.

15. The near field communication reader of claim 14, wherein the control system is configured cause the wireless charging circuitry to output a reduced charging field for recharging a battery of the near field communication device if a passive near field communication device is also present.

16. The near field communication reader of claim 10, wherein the control system is configured to reduce the amplitude of the carrier signal by ceasing output of the carrier signal during the selected duration.

17. The near field communication reader of claim 10, wherein the control system is configured to reduce the amplitude of the carrier signal by reducing the amplitude of the carrier signal below a passive modulation threshold representing a threshold below which the carrier signal does not adequately power a passive load modulation near field communication device.

18. The near field communication reader of claim 10, wherein the control system is configured to resume transmission of the carrier signal after the selected duration.

19. The near field communication reader of claim 10, wherein the selected duration is less than an expected duration of the identification signal.

20. The near field communication reader of claim 10, wherein the control system is configured to determine that the near field communication device is a passive load modulation near field communication device if the near field communication device ceases to transmit the identification signal during the selected duration.

* * * * *